Dec. 3, 1968 W. J. MORROW ET AL 3,414,848
MICROWAVE STRIP TRANSMISSION LINES
Filed Nov. 1, 1966
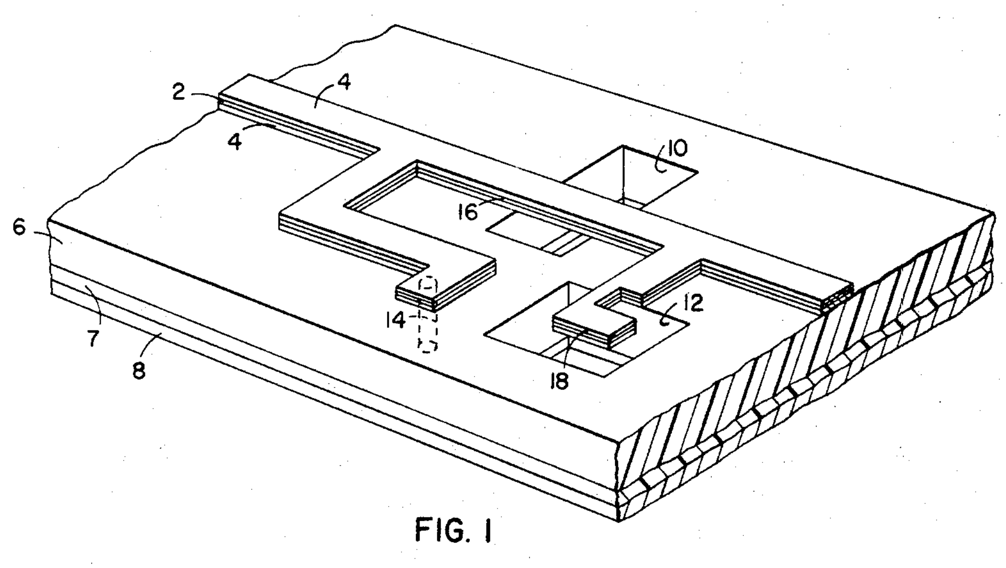
FIG. I
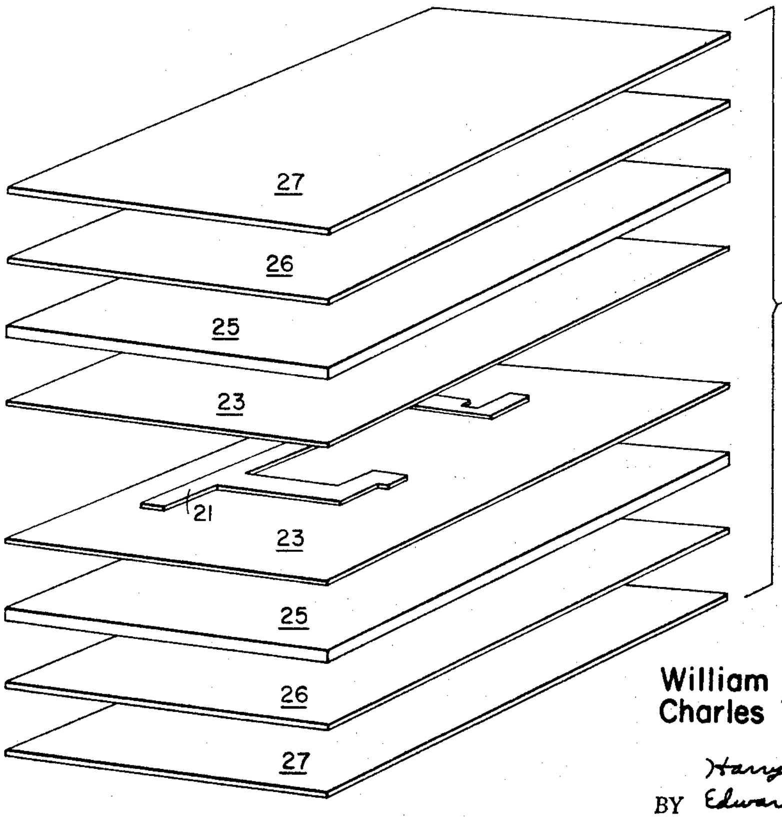
FIG. 2
William J. Morrow
Charles T. Rucker,
INVENTORS.
Harry M. Saragovitz
BY Edward J. Kelly
Herbert Berl
Alfred E. Smith United States Patent Office 3,414,848

Patented Dec. 3, 1968

3,414,848

MICROWAVE STRIP TRANSMISSION LINES

William J. Morrow, St. Petersburg, and Charles T. Rucker, Clearwater, Fla., assignors, by mesne assignments, to the United States of America as represented by the Secretary of the Army Filed Nov. 1, 1966, Ser. No. 591,348
9 Claims. (Cl. 333—84)

The present invention relates to strip transmission lines and has particular reference to strip transmission line devices, that is, strip transmission lines which comprise circuit components or within which are located circuit components.

Stripline cables have evolved from coaxial type waveguides and waveguide devices of coaxial type and possess certain features and characteristics of both rectangular pipe and coaxial type waveguides and are generally designed for and are finding increasing application at microwave frequencies. Stripline cables of symmetrical, double-ground type consist of a thin metallic strip, termed the center strip or conductor, sandwiched between two sheets of low-loss dielectric material, the outer sides of the dielectric sheets being clad with conductive material, termed ground-planes.

This invention calls for an etched circuit, consisting of a copper center strip or conductor, bonded on one or both sides, with a thin film of dielectric material, to be placed between two sheets of unclad dielectric material and the sandwich thus formed placed between metallic ground planes. Whereas conventional strip transmission lines are satisfactory for simple microwave circuits, there is no known way of achieving features similar to those disclosed by this invention where the microwave circuit overhangs a large opening through the dielectric material. such an overhang or bridge can perform useful electrical functions, such as permitting the formation of RF capacitors by filling the opening with a metallic block (or RF equivalent thereof) separated from the metallic microwave circuit by a thin film of dielectric which, in the case of this invention, is the base material to which the microwave circuit is bonded. Such a construction also permits matching devices such as tuning screws to come within close proximity to the microwave circuit through premachined openings in the thick dielectric material, but prevents actual contact with the circuit by virtue of the thin dielectric substrate which can be readily applied to both sides of the metallic circuit. Use of a laminated cover sheet over the metallic circuit also provides corrosion protection obviating requirements for plating which is usually gold. Where areas of the circuit must be exposed to form electrical connections, the cover sheet of film can be prepunched (or otherwise machined) prior to laminating and only the exposed areas plated. This drastically reduces the amount of plating required and results in a significant decrease in plating costs.

Additionally, mechanical flexibility of circuits formed on a thin film permits them to be folded to form a multilayer sandwich without a discontinuity in the circuits. Transitions from one plane to another can be achieved by simple bends in the circuit. Further, this invention can be readily extended to create physically flexible strip transmission line devices, rather than conventional rigid units. It is only necessary to utilize a flexible dielectric material and flexible ground planes (either quite thin or formed of mesh or screen-like material) to permit the strip transmission line device to be mechanically deformed from a flat plane without loss of electrical performance. Such a stripline would permit units to be bent and formed to fit irregular volumes to increase packaging versatility. Further, the thin substrate may be of a material having a certain set of characteristics desirable to achieve circuit functions (such as a high melting point to allow soldering without damage) and the surrounding dielectric materials may have other characteristics such as low cost.

Therefore, it is an object of this invention to provide a strip transmission line which enables the addition of matching devices, capacitors, etc. to the stripline with relative ease.

Another object of this invention is to provide a microwave stripline device that may be flexible without causing discontinuity in the circuit.

Additionally, it is an object of this invention to provide a microwave stripline cable having a center conductor which requires plating with gold or like substance only in areas where electrical connections are necessary and laminated with a dielectric material in all other areas providing a stripline cable, the center conductor of which is corrosion resistant.

These and other objects and advantages of this invention will be readily appreciated as the same becomes better understood by reference to the following description when considered in connection with the accompanying drawings wherein:

FIGURE 1 is a perspective view of a stripline cable according to the present invention, partly broken away.

FIGURE 2 is an exploded perspective view of a stripline cable according to the present invention.

Referring now to FIGURE 1, an etched circuit or center conductor 2, laminated with a thin film of dielectric material 4 is shown bonded to dielectric sheets 6, dielectric film 7 and ground plane 8.

Dielectric 6 has premachined or prepunched cavities 10, 12, and 14 formed therein over which the stripline bridges 16 or overhangs 18 permit the formation of RF capacitors by filling the opening with a metallic block. Cavities similar to cavity 14 permit devices such as tuning screws to come within close proximity of the stripline. The stripline overhang, bridge, etc. may be electrically contacted provided the laminate over the stripline is prepunched and the exposed surface plated with a conductive, corrosion-resistant metal.

Formation of the stripline cable may be better understood by reference to FIGURE 2, an exploded view of the same, in which the stripline 21 is double-laminated with dielectric film 23. This combination is sandwiched between two sheets of dielectric 25, which are, in turn, bonded to dielectric film 26 and ground planes 27. Holes, cavities, etc may be placed at any point along the strip transmission line as the designer may so desire. It is understood that a plurality of center conductors may be used in the same way as the singular conductor 21 and that any number or combination of circuit components may be added to the configuration thereof.

An exemplary strip transmission line according to the present invention would incorporate a laminated thin strip transmission line consisting of 0.001–0.003 in. copper with a sheet of 0.001 in Mylar on each side bonded to the copper with 0.0005 in. of polyethylene. This construction is achieved by bonding the copper to one layer of Mylar film. The circuit is then formed from the copper by standard photo etching techniques and a prepunched cover sheet is then laminated over the circuit. Only small areas of copper remaining exposed to form electrical contacts and receive gold plate, since the cover sheet forms an effective mask. It is equally feasible that circuits with sufficient mechanical integrity could be stamped or otherwise formed in metal and then layed between two layers of premachined film and subsequently bonded.

Obviously, many modifications and variations of the present invention are possible in the light of the above teachings. It is, therefore, to be understood that within the scope of the appended claims the invention may be practiced otherwise than as specifically described.

What is claimed is:

1. A base microwave strip transmission line adaptable to house circuit components in juxtaposition with the strip line circuit comprising: a stripline circuit of conductive material; first and second thin layers of dielectric material disposed on opposite sides of said stripline circuit; a dielectric sheet having a thickness substantially greater than that of said dielectric layers; said sheet being disposed adjacent to a first of said layers of dielectric; a dielectric film; said film being disposed adjacent to said dielectric sheet; and a conductive ground plane disposed adjacent to said film.

2. A microwave strip transmission line as set forth in claim 1 wherein said dielectric sheet has openings formed therein.

3. A microwave strip transmission line as set forth in claim 1 wherein said dielectric sheet and said ground plane are formed of flexible material.

4. A microwave strip transmission line as set forth in claim 1 and further comprising a second sheet of dielectric; a second dielectric film; and a second ground plane, respectively, disposed adjacent to one another and disposed adjacent to a second of said layers of dielectric.

5. A microwave strip transmission line as set forth in claim 4 wherein at least one of said second sheet of dielectric, said film, and said second ground plane are bonded in their respective positions.

6. A microwave strip transmission line as set forth in claim 1 wherein at least one layer of said first and second thin layers of dielectric material is laminated to said stripline circuit.

7. A microwave strip transmission line as set forth in claim 1 wherein said sheet of dielectric is bonded to one of said layers of dielectric.

8. A microwave strip transmission line as set forth in claim 1 wherein said film is bonded to said sheet of dielectric.

9. A microwave strip transmission line as set forth in claim 1 wherein said conductive ground plane is bonded to said film.

References Cited

UNITED STATES PATENTS 3,259,860 7/1966 Ayer ---------------- 333—84

HERMAN KARL SAALBACH, *Primary Examiner.*

L. ALLAHUT, *Assistant Examiner.*